United States Patent [19]

McNeely

[11] 4,375,247
[45] Mar. 1, 1983

[54] ROLLER SUSPENSION

[75] Inventor: Robert T. McNeely, Peoria, Ill.

[73] Assignee: Caterpillar Tractor Co., Peoria, Ill.

[21] Appl. No.: 250,744

[22] PCT Filed: Aug. 18, 1980

[86] PCT No.: PCT/US80/01071
§ 371 Date: Aug. 18, 1980
§ 102(e) Date: Aug. 18, 1980

[87] PCT Pub. No.: WO82/00692
PCT Pub. Date: Mar. 4, 1982

[51] Int. Cl.³ .............................................. B66B 9/20
[52] U.S. Cl. .................................... 187/9 R; 187/95;
308/3 B; 308/184 R
[58] Field of Search .......................... 187/9 R, 9 E, 95;
308/184 R, 184 A, 3 B, 26; 295/36 A; 301/5.7

[56] References Cited

U.S. PATENT DOCUMENTS

| T981,004 | 4/1979 | McNeely et al. | 308/26 |
| 1,152,680 | 9/1915 | Wieselgreen | 308/184 |
| 2,092,291 | 9/1937 | Olsen | 308/184 R |
| 2,238,435 | 4/1941 | Perry | 403/225 |
| 3,070,190 | 12/1962 | Rogers et al. | 187/95 |
| 3,083,853 | 4/1963 | Hastings, Jr. | 403/629 |
| 3,447,846 | 8/1965 | Marsh | 308/184 |
| 3,604,545 | 9/1971 | Bourgeois | 192/98 |
| 3,690,639 | 9/1972 | Brandon et al. | 267/57.1 R |
| 3,871,494 | 3/1975 | Kelley, Jr. | 187/9 E |
| 3,976,340 | 8/1976 | Pitner | 308/184 R |
| 4,035,040 | 7/1977 | Yarris | 308/72 |
| 4,240,526 | 12/1980 | Sanders | 187/9 R |

FOREIGN PATENT DOCUMENTS

| 174257 | 3/1953 | Fed. Rep. of Germany | 308/184 R |
| 1029523 | 12/1950 | France | 308/184 R |
| 726836 | 3/1955 | United Kingdom | 308/184 R |

Primary Examiner—H. Grant Skaggs
Attorney, Agent, or Firm—Phillips, Moore, Weissenberger, Lempio & Majestic

[57] ABSTRACT

A self-aligning mounting structure (52) for preventing flaking of, for example, the uprights (16) on a lift truck includes a crowned spring (94) positioned between an axle shaft (76) and a bearing assembly (82) of a roller (22) to allow the roller (22) to maintain full face contact with the uprights (16). The crowned spring (94) additionally acts as a shock absorber to reduce the effect of impact loading. A snubber spring ring (106) can be positioned adjacent the crowned spring (94) to stiffen said crowned spring (94) and further reduce the effect of impact loading. With two or more mounting structures (52), crowned spring (94) allows a load sharing among the rollers (22).

13 Claims, 6 Drawing Figures

ROLLER SUSPENSION

DESCRIPTION

Technical Field

The present invention is related to a roller mounting structure and in particular to a roller mounting structure for the carriage and mast of a lift truck.

Background Art

Carriage mounting arrangements and lift mast mounting arrangements of the type shown in U.S. Pat. No. 3,851,732, issued to R. A. Wagner, et al on Dec. 3, 1974, are well known. In general, the lift mast mounting includes a movable upright which is longitudinally movable within a fixed upright by disposing a plurality of rigidly mounted wheels or guide rollers therebetween. The carriage mounting arrangement includes a carriage which is longitudinally moved with respect to the movable upright by disposing another plurality of rigidly mounted wheels or guide rollers therebetween.

It has been observed that the roller engaging surface of the uprights experiences wear and surface flaking after extended periods of operation due to misalignment of the roller with the upright. This misalignment is caused, in part, by uneven loading of the carriage forks and the unevenness of the rollers and uprights as manufactured. The wear and flaking is the result of a relatively small area of total contact between the edge of the hardened steel tread portion of the rollers and the surface upon which they roll, which produces high contact stresses. Even higher levels of contact stresses are generated with the increased distortion of the surface caused by continuing flaking and with further misalignment of the rigidly mounted rollers. In order to minimize these stresses, close control of the material utilized along with close control of the manufacturing and assembly of the rollers and uprights has been found necessary. However, despite all these precautions, excessive wear of the roller engaging surface is still experienced.

A solution to this problem can be found in U.S. Pat. No. 4,035,040, issued to William T. Yarris on July 12, 1977, and relating to a self-alignment wheel mount structure. This device calls for a supporting axle shaft having a crown bearing seat thereon and a bearing assembly which mounts on the seat. The bearing assembly includes an inner race having a substantially cylindrical internal bore rockably mounted on the crowned bearing seat. This wheel mounting structure is self-alignable and reacts to imperfections in the load bearing surface of the uprights to assure optimum contact between the roller and the surface upon which it rolls. However, such a system requires accurate machining and, thus, is expensive to manufacture. Further, such a system does not provide for load sharing between the various rollers which secure the carriage to the movable upright and the movable upright to the fixed upright.

Another prior art device which addresses this problem includes an elastomeric ring member positioned between the shaft and the bearing assembly and provides self-aligning of the roller with respect to the surface upon which it rolls. Such an arrangement can provide for limited absorption of shock due to impact loading of the carriage.

Another approach used to solve the above problem is to crown the outer diameter of the roller to reduce the edge-loading tendency. However, this reduces the roller contact or footprint with the surface of the upright and therefore increases the contact stress. Further, such an arrangement also requires expensive machining.

The present invention is directed to overcoming one or more of the problems as set forth above.

DISCLOSURE OF THE INVENTION

In one aspect of this invention, a mounting structure has an axle shaft and a bearing assembly positioned about the axle shaft and the improvement comprises a spring being positioned between the bearing assembly and the axle shaft.

The above invention provides an inexpensive and efficient way to have a roller which is self-aligning and thus, responsive to any forces placed thereon; as, for example, by the uneven loading of the carriage of the lift truck. When uneven loading does occur, the spring is deflected allowing the roller to have full face contact with the surface upon which it rolls. Further, such an apparatus is economical in that it does not require expensive machining as would be the case if a crowned shaft were involved. Such an arrangement has the further advantage that it can accommodate looser tolerances than prior art devices. Further, the deflection of the spring allows for the absorption of impact loads and thus, cushions and damps any loading of the rollers.

In another aspect of the invention, a load lifting apparatus comprises an upright, a carriage, and at least three roller mounting structures being attached to said carriage. Each roller mounting structure has an axle shaft and a bearing assembly positioned about said axle shaft, with a roller being mounted to each said bearing assembly. The load lifting apparatus further comprises a spring positioned between each said bearing assembly and said axle shaft. Such an apparatus provides for load sharing between the rollers so that no roller is overloaded while another roller is underloaded. Such an arrangement accounts for longer roller and mast life, is cheaper to manufacture and machine than existing systems, and can tolerate inaccuracies in both the carriage structure and the uprights.

BEST MODE OF CARRYING OUT THE INVENTION

Figure 1:
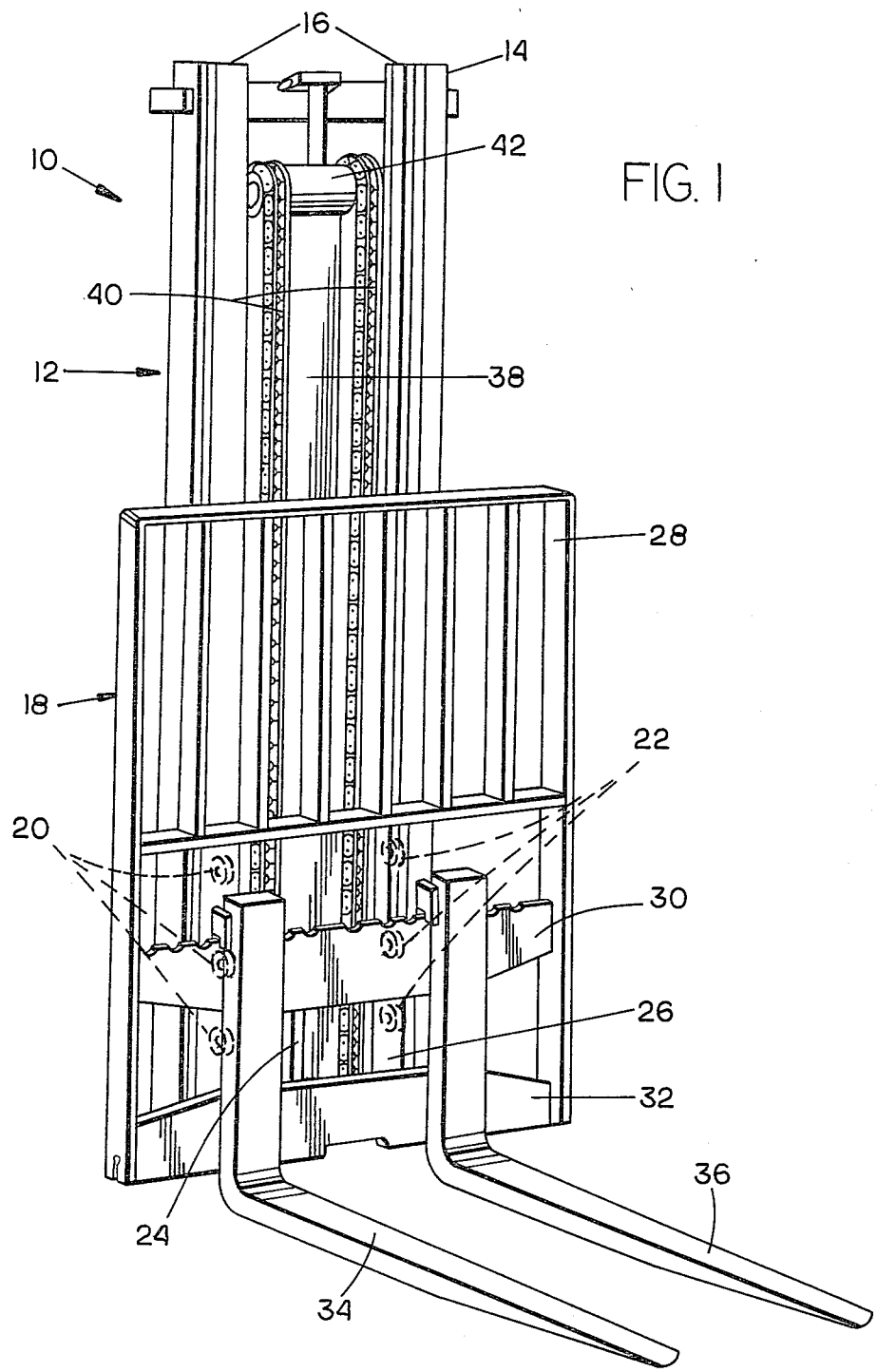
FIG. 1 is a front perspective view of a mast and carriage for a lift truck.

FIG. 1 depicts a load lifting apparatus 10 which includes a mast 12 which has fixed uprights 14 that is affixable to, for example, a lift truck (not shown) and movable uprights 16 which are movably mounted to fixed uprights 14. A carriage 18 is movably mounted to movable uprights 16 by first and second sets of rollers 20 and 22 which are mounted on roller brackets 24 and 26 of carriage 18. Carriage 18 further includes a load backrest 28 and hanger brackets 30 and 32 which support forks 34 and 36. A hydraulic lift cylinder 38 is disposed adjacent the movable uprights 16 of the mast 12. Lift cylinder 38 is connected between the movable uprights 16 and crosshead 42, and the affixed uprights 14. Lift chains 40 are disposed about crosshead 42 and are connected at one end to fixed uprights 14 and at the other end to carriage 18. The actuation of lift cylinder 38 causes crosshead 42 to urge movable uprights 16 upwardly, which causes chains 40 to pull carriage 18 upwardly on movable uprights 16.

Figure 2:
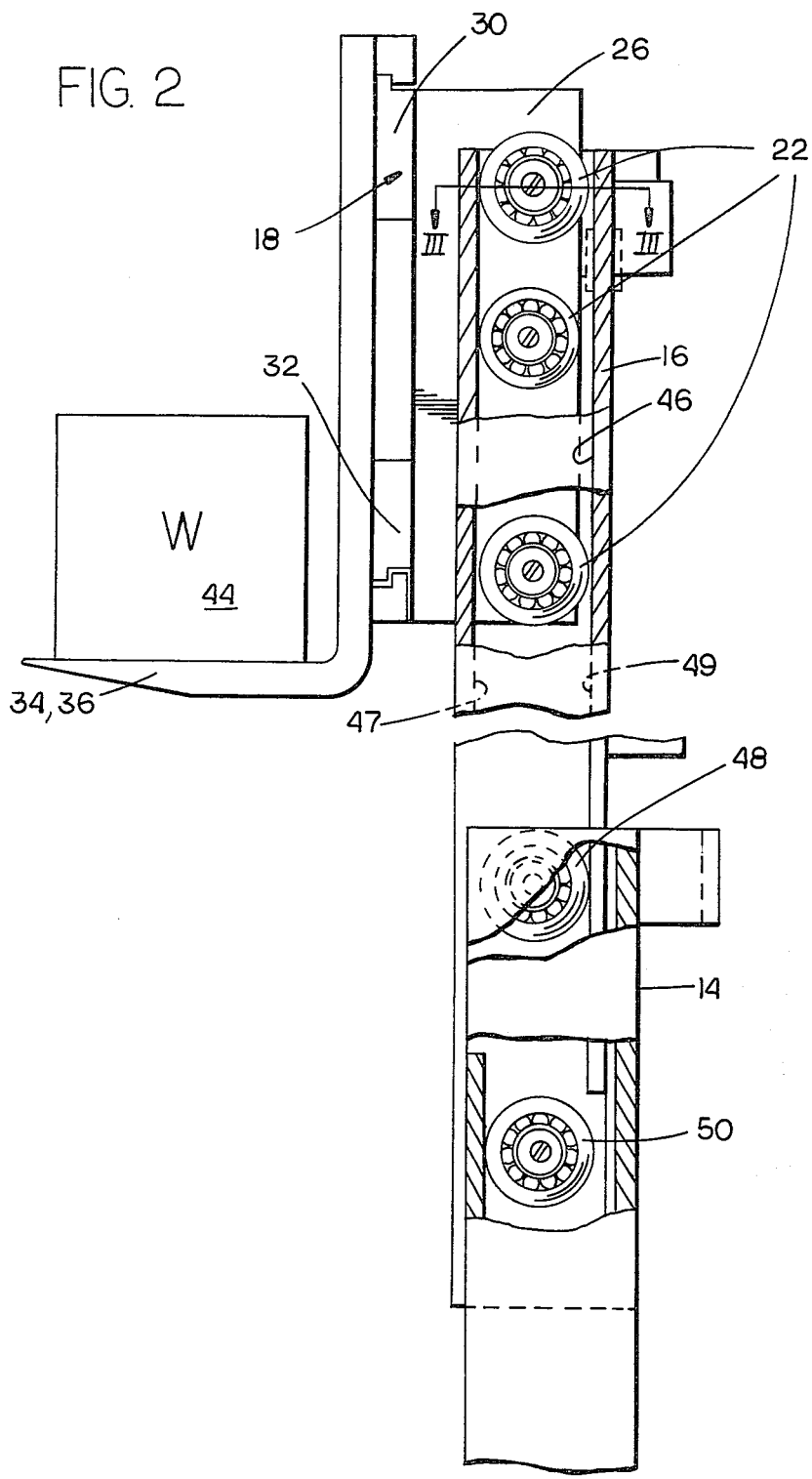
FIG. 2 is a right-end view partially cut away and partially sectioned of the mast and carriage of FIG. 1.

In FIG. 2 the carriage 18 and movable uprights 16 are depicted in a substantially upwardmost position with respect to fixed uprights 14. For purposes of illustration, a weight 44 is positioned on forks 34, 36. Rollers 22, which are mounted to roller bracket 26, are depicted as being disposed in channel 46 of movable uprights 16. Channel 46 includes rear rail surface 47 and front rail surface 49 upon which roller 22 can roll. Further, mast rollers 48 and 50 which are similar in design and structure to rollers 20 and 22, and which allow the movable uprights 16 to slide relative to fixed uprights 14, are depicted. Mast roller 48 is attached to fixed uprights 14 and mast roller 50 is attached to movable uprights 16. Rollers 20, 22, 48 and 50 can be comprised of hot rolled alloy steel which provides good wear resistance.

Figure 3:
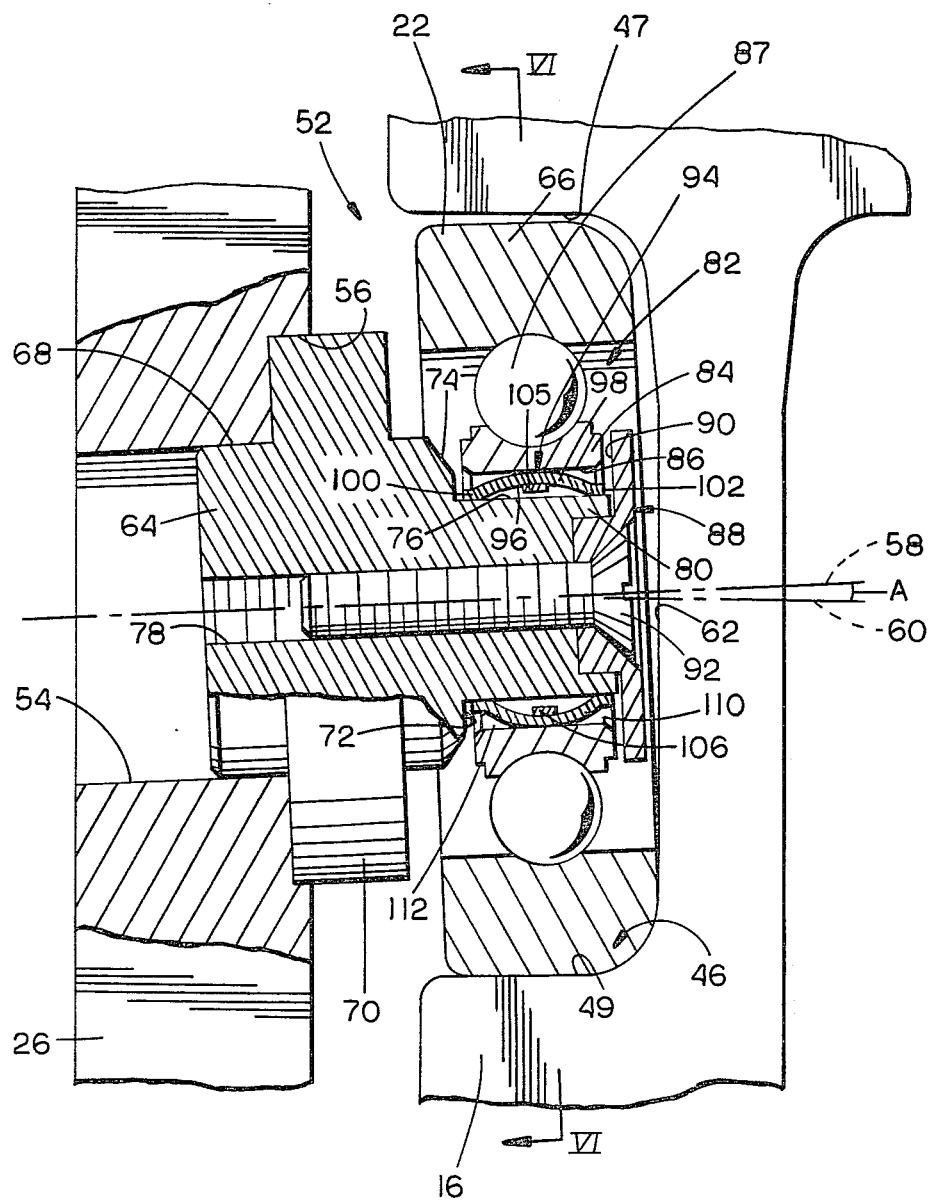
FIG. 3 is a cross-sectional view of an embodiment of the invention taken through line III—III of FIG. 2.

In FIG. 3, a cross-sectional view of one of rollers 22 with an annular tread portion 66 is depicted along with roller mounting structure 52. It is to be understood that although the above description of roller mounting structure 52 is discussed in relationship to roller bracket 26 of carriage 18 and channel 46 of movable uprights 16, the discussion applies equally well to the roller mounting structures for rollers 20, 48, and 50.

As is represented in FIG. 3, carriage roller bracket 26 has a transversely-oriented bore 54 and a concentric counter-bore 56 defined therein for receiving roller mounting structure 52. Bore 56 opens laterally outwardly from bore 54. Furthermore, bore 54 and counter-bore 56 are oriented with a central axis 58 which is canted or inclined at an angle, identified by the letter "A" in FIG. 3, of approximately three degrees from a transverse axis 60 which is normal to web surface 62 of channel 46.

Roller mounting structure 52 includes a supporting axle shaft or a bearing support member 64. Axle shaft 64 extends laterally outward from the roller bracket 26 to serve as a mount for roller 22. Axle shaft 64 includes a reduced diameter end 68 which is rigidly secured within the bore 54, and a centrally disposed flange 70 mounted within the counter-bore 56. In addition, axle shaft 64 includes a shoulder 72 positioned adjacent to flange 70 which shoulder 72 has an annular beveled portion 74. Extending from shoulder 72 is a reduced diameter end shaft 76, which provides in a preferred embodiment a right circular cylindrical bearing seat. A threaded bore 78 is provided through axle shaft 64 and has an outwardly-facing counter-bore 80. Roller mounting structure 52 includes a bearing assembly 82, having an inner race 84 which defines an internal cylindrical bore 86 and which is disposed about and spaced from end shaft 76. Furthermore, the bearing assembly 82 includes a plurality of anti-friction ball bearings 87 which are equally spaced about the outer periphery of the inner race 84 and are adapted to rotate freely and support roller 22.

The inner race 84 is trapped for limited axial movement between a bearing retaining flange 88 which has a facing thrust surface or shoulder 90 and shoulder 72. Bearing retaining flange 88 is seated in counter-bore 80 and held in contact therewith by fastener 92 which is disposed in bore 78 of roller mounting structure 52.

Figure 4:
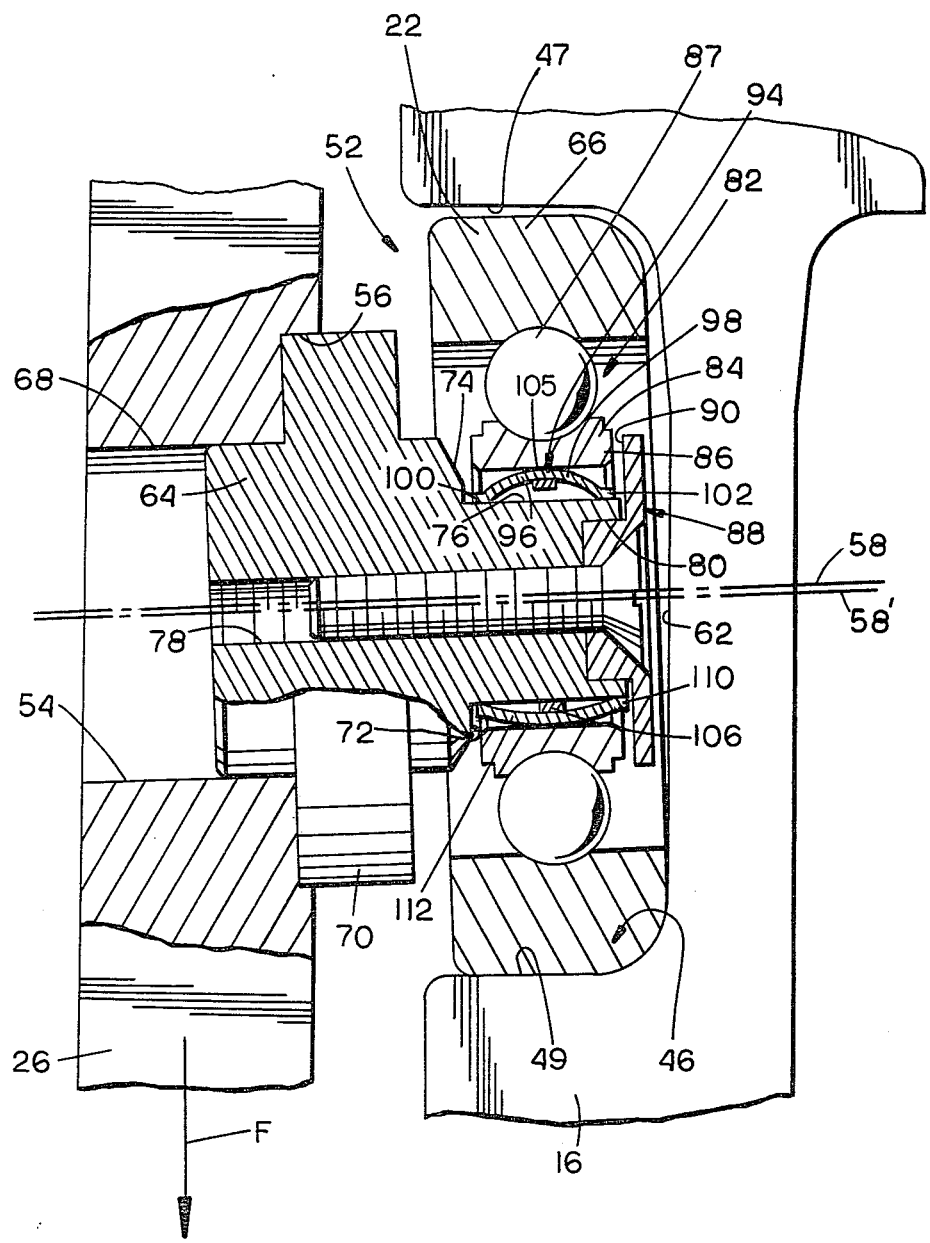
FIG. 4 is a view similar to FIG. 3 with the crowned spring of the roller mounting structure of an embodiment of the invention deflected.
Figure 6:
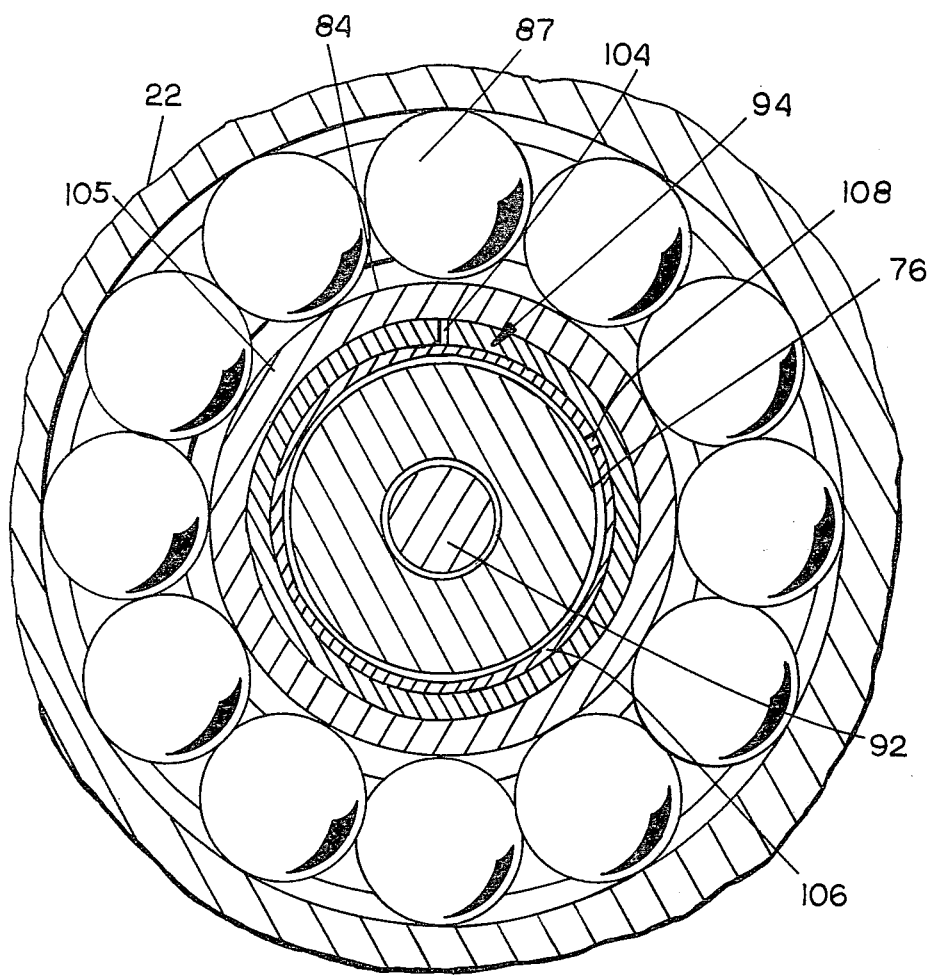
FIG. 6 is a cross-sectional view taken through line VI—VI of FIG. 3.

In accordance with one aspect of the invention, a crowned axial tubular spring 94 is disposed between end shaft 76 and internal bore 86 of race 84. Crowned spring 94 can have a variety of shapes and still conform with the intent of the invention. Generally, crowned spring 94 includes a portion which is spaced from shaft 76 and which can be flexed toward shaft 76. An embodiment of crowned spring 94 as depicted in FIG. 4 has a concave side 96 and a convex side 98. The annular end portions 100 and 102 of crowned spring 94 are in contact with end shaft 76 in a preferred embodiment. Further, a crown 105 of crowned spring 94 is in contact with the bore 86 of inner race 84. It is to be understood that the cross-sectional length of crowned spring 94 from end 100 to end 102 is less than the distance between shoulder 72 and shoulder 90, such that, when crown spring 94 is flexed toward end shaft 76, ends 100 and 102 can slide outwardly along end shaft 76. As can be seen in FIG. 6, crowned spring 94 has a transverse slit 104 which extends from end 100 to end 102. As crowned spring 94 is flexed, slit 104 becomes increasingly narrow.

In another aspect of the invention, a snubber spring ring 106 is disposed adjacent and in contact with the concave surface 96 of crowned spring 94. As can be seen in FIG. 3, in a preferred embodiment snubber spring ring 106 is disposed adjacent the crown 105 of crowned spring 94. Further, snubber spring ring 106 defines a slit 108 (FIG. 6) which can narrow as snubber spring ring 106 is flexed. Snubber spring ring 106 acts to stiffen the crowned spring 94 and retard or snub the displacement thereof when a load is placed thereon. Snubber ring 106 acts as a stop. In the case of a gross overload ramming the forks into a wall, the spring 94 would bottom out on the snubber 106 and therefore not suffer structural damage. It is to be understood that in a preferred embodiment snubber spring ring 106 and crowned spring 94 can be comprised of appropriate spring steel and that snubber spring ring 106 can be removed if the crown spring 94 is of sufficient thickness to support the design load. Additionally, other stiffeners (not shown), including transverse ribs, can be used in place of ring 106.

INDUSTRIAL APPLICABILITY

FIG. 3 depicts an unloaded situation where the crowned spring 94 and the snubber spring ring 106 are in a nondeflected mode. FIG. 4 depicts the roller mounting structure 52 with a force applied thereto in the direction of the arrow identified by the letter "F," which translates axis of rotation 58 of the roller 22 laterally to a new position 58'. Force "F" could be exerted on roller 22 when a load is placed on the forks 34 and 36, causing forward loading of the upper rollers with the forward tilting of the carriage with respect to the movable uprights 16. Accordingly, the portion of crowned spring 94 and snubber spring ring 106 which is located closest to the front rail surface 49 is compressed as shown in FIG. 4. It is noted that full face contact is maintained between tread portion 66 and front rail surface 49. Also, it is to be noted that FIG. 4 depicts the most flexed position or more of the crowned spring 94 and that ends 100 and 102 of crowned spring 94 can come in contact with shoulders 72 and 90 with snubber spring ring 106 in contact with end shaft 76. As full face contact is maintained, there is no misalignment of the roller 22 with respect to the channel 46 and surface 49 such that the edge of the roller 22 provides the only contact between roller 22 and surface 49. This being the case, flaking of the mast uprights due to high cyclical loading and due to manufacturing tolerances is greatly reduced.

Further the crowned spring 94 and the snubber spring ring 106 act as a shock absorber to reduce the effect of impact loading and associated roller failures. Still further, the above invention allows for load sharing between the various rollers which mount the carriage 18 to the movable uprights 16. Instead of having the upper and lower rollers 22 in FIG. 2 overloaded (contacting surfaces 47 and 49, respectively), with the middle roller 22 underloaded or not loaded at all (positioned between surfaces 47 and 49), the the crowned spring 94 and snubber spring ring 106 allow all three of the rollers 22 to share the load placed by carriage 18 on movable uprights 16. Accordingly, the load is distributed more evenly between the rollers.

In a twisting force or bending moment as, for example, could be experienced when the carriage is unevenly loaded, is applied to the roller suspension system 52 as indicated by the arrow designated F' in FIG. 5, the roller is again self-aligning in order that the tread 66 maintains full face contact with the front or rear rail surface 47 and 49. Axis 58 is twisted to a new position 58".

Figure 5:
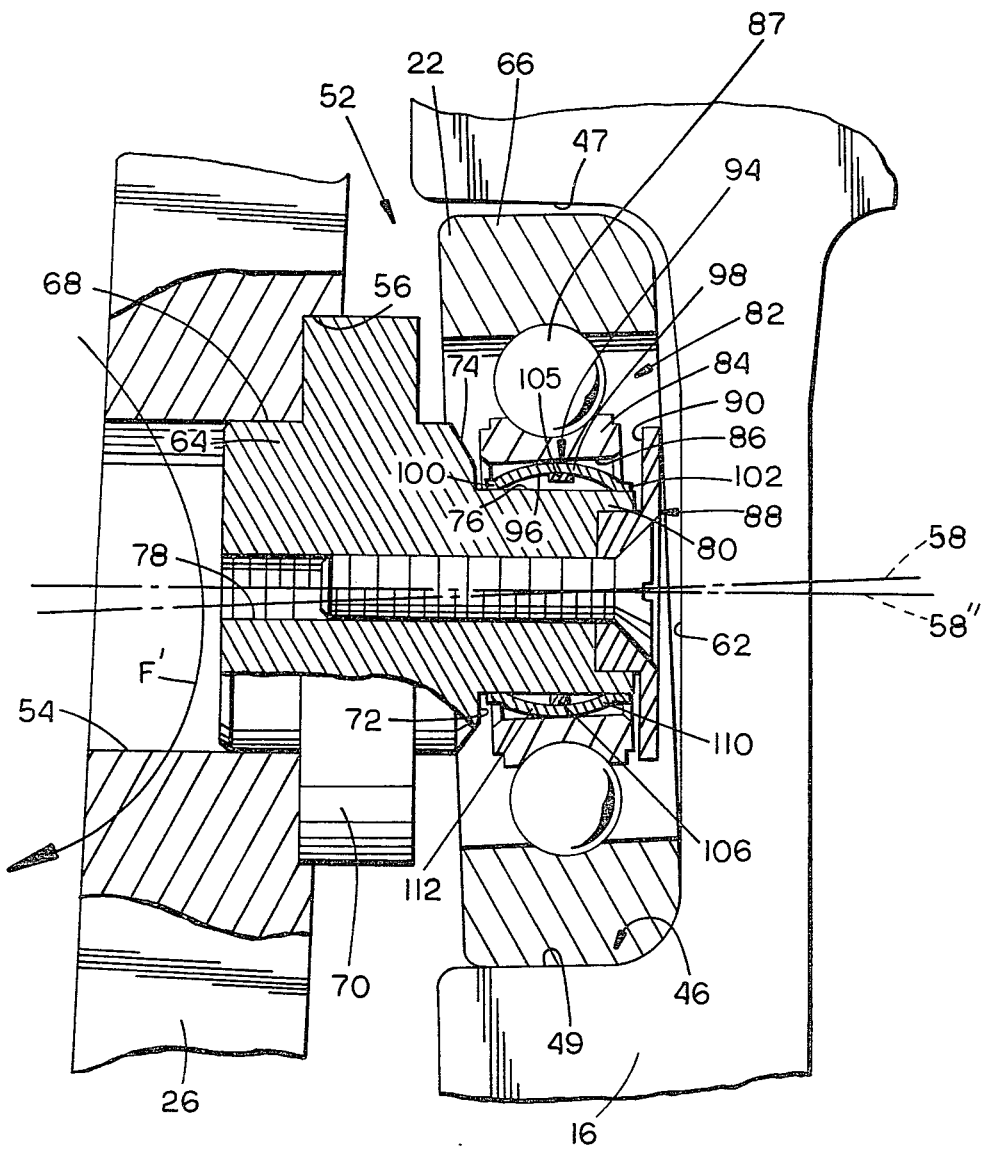
FIG. 5 depicts a view similar to that of FIG. 4 with the crowned spring deflected in a different manner.

As can be seen in FIG. 5, the right portion 110 of crowned spring 94 is deflected to a greater extent than the left portion 112, which right and left portions are closest to front rail surface 49. With such a force as applied in FIG. 5, the crowned spring 94 and snubber spring ring 106 of the invention again allow for load sharing among all six rollers including the three rollers 22 which contact the front rail surface and the three rollers 20 (FIG. 1) which contact the rear rail surface of another channel (not shown). Were it not for the above arrangement, it would be possible for only three of the six rollers to determine a plane and share the load and thus, be overloaded, while the remaining three rollers would be underloaded. However, with the above arrangement, no rollers are overloaded. As the rollers are maintained in an shared load condition and as there is full rim contact, flaking due to high cyclical loading is reduced or eliminated.

Other aspects, objects and advantages of this invention can be obtained from a study of the drawings, the disclosure and the appended claims.

What is claimed is:

1. In a mounting structure (52) having an axle shaft (76) and a bearing assembly (82) being positioned about said axle shaft (76), the improvement comprising:
   a crowned spring (94) with an annular concave surface (96) positioned between said bearing assembly (82) and said axle shaft (76); and
   a snubber spring ring (106) positioned adjacent the crown (105) of the concave surface (96) of said crowned spring (94) in the space between the concave surface (96) and the axle shaft (76).

2. The mounting structure (52) of claim 1 wherein said axle shaft (76) is a right circular cylinder.

3. The mounting structure (52) of claim 1 wherein said snubber spring ring (106) has a split (108).

4. The mounting structure (52) of claim 1 wherein said crowned spring (94) has a split (105).

5. The mounting structure (52) of claim 1 wherein said axle shaft (76) has first and second shoulders (72,90) and wherein said crowned spring (94) has an unflexed position, spaced from said first and second shoulders (72,90).

6. A roller mounting structure (52) comprising:
   a right cylindrical axle shaft (76);
   a bearing assembly (82) being positioned about said axle shaft (76) and adapted for mounting a roller (22);
   a crowned spring (94) with an annular concave surface 96 being positioned between said bearing assembly (82) and said axle shaft (76) such that said concave surface (96) is positioned adjacent said axle shaft (76) and
   a snubber spring ring (106) positioned adjacent the crown (105) of the concave surface (96) of said crowned spring (94) in the space between the concave surface (96) and the axle shaft (76).

7. The roller mounting structure (52) of claim 6 wherein said axle shaft (76) has first and second shoulders (72,90) and wherein said crowned spring (94) has an unflexed position spaced from said first and second shoulders (72,90).

8. A load lifting apparatus (10) comprising:
   a mast (12) having an upright (16);
   a carriage (18);
   a roller (22) being disposed to roll in said upright (16);
   a roller mounting structure (52) having an axle shaft (76) and a bearing assembly (82) positioned about said axle shaft (76) and being attached to said carriage (18), said roller (22) being mounted to said bearing assembly (82);
   a crowned spring (94) with an annular concave surface (96) positioned between said bearing assembly (82) and said axle shaft (76); and
   a snubber spring ring (106) positioned adjacent the crown (105) of the concave surface 96 of said crowned spring (94) in the space between the concave surface (96) and the axle shaft (76).

9. The load lifting apparatus (10) of claim 8 wherein said axle shaft (76) has first and second shoulders (72,90) and wherein said crowned spring (94) has an unflexed position spaced from said first and second shoulders (72,90).

10. A load lifting apparatus (10) comprising:
    a mast (12) having an upright (16);
    a carriage (18);
    at least two rollers (22) being disposed to roll on said upright (16);
    at least two roller mounting structures (52) being attached to said carriage (18), each roller mounting structure (52) having an axle shaft (76) and a bearing assembly (82) positioned about said axle shaft (76), one of said rollers (22) being mounted to each said bearing assembly (82);
    a crowned spring (94) with an annular concave surface 96 positioned between each said bearing assembly (82) and said axle shaft (76); and
    a snubber spring ring (106) positioned adjacent the crown (105) of the concave surface (96) of each said crowned spring (94) in the space between the concave surface (96) and the axle shaft (76).

11. The load lifting apparatus (10) of claim 10 wherein said two rollers (22) are disposed linearly, wherein each said crowned spring (94) has an unloaded position and a plurality of flexed, loaded positions and wherein each crowned spring (94) assumes one of the plurality of flexed, loaded positions in response to and shares a load placed on said carriage (18).

12. The load lifting apparatus of claim 10 further including third and fourth rollers (20), and in which a maximum of two said rollers (20,22) are disposed linearly, wherein each said crowned spring (94) has an unloaded position and a plurality of flexed, loaded positions, and wherein each crowned spring (94) assumes one of the plurality of flexed, loaded positions in response to and shares a load placed on said carriage (18).

13. A load lifting apparatus (10) comprising:
a mast (12) having first and second uprights (14,16);
a roller (22) being disposed to roll on one of said uprights (14,16);
a roller mounting structure (52) having an axle shaft (76) and a bearing assembly (82) positioned about said axle shaft (76) and being attached to the other of said uprights (14,16), said roller (22) being mounted to said bearing assembly (82);
a crowned spring (94) with an annular concave surface (96) positioned between said bearing assembly (82) and said axle shaft (76); and
a snubber spring ring (106) positioned adjacent the crown (105) of the concave surface (96) of said crowned spring (94) in the space between the concave surface (96) and the axle shaft (76).

* * * * *